2,966,887

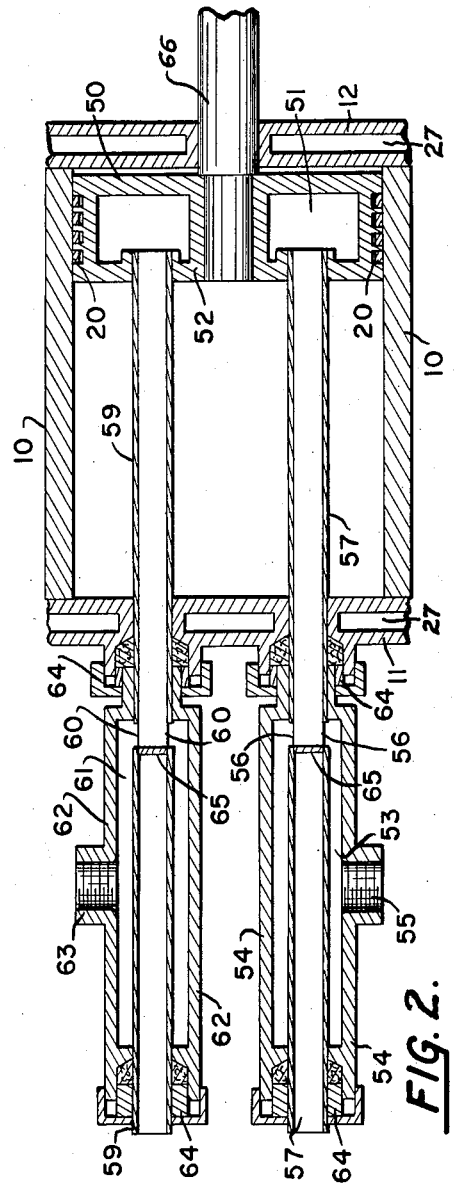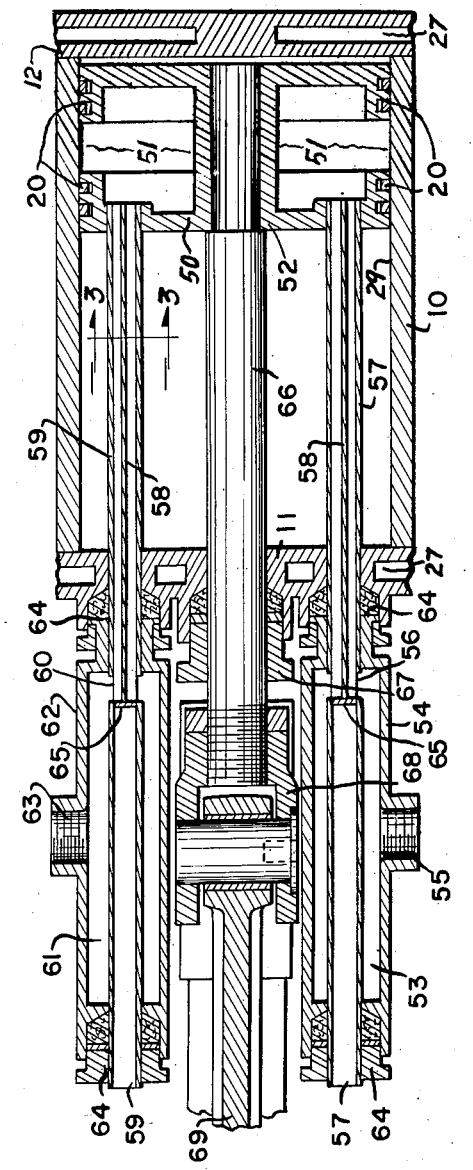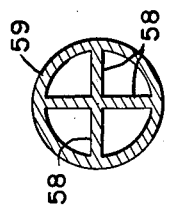

HIGH TEMPERATURE PISTON ENGINES

Henry M. Arnold, Denver, Colo.
(222 S. 5th St., Douglas, Wyo.)

Filed Jan. 4, 1960, Ser. No. 417

3 Claims. (Cl. 121—38)

This invention relates to piston engines using highly heated gases and, or, highly superheated steam for reciprocating a piston in the engine cylinder.

The main object of my invention is to provide an improved means for circulating a cooling agent, or cooling, sealing and lubricating agent through the piston of an engine of the character stated. Efforts have been made to circulate such agents through engine pistons but the mechanisms heretofore devised for that purpose have employed flexible connections, sliding tubing with no means for securing a seal against leakage, a detrimental change in volume of the circulating chambers as the piston reciprocates and other shortcomings which have proven to be inefficient and unsatisfactory in use.

Other objects and advantages of the invention will become apparent from the drawings and following specification, in which like or corresponding numerals designate the same or similar parts throughout the several views and in which:

Fig. 1 is a longitudinal sectional view of an engine embodying my invention.

Fig. 2 is another longitudinal sectional view of an engine embodying my invention.

Fig. 3 is a cross-sectional view of the tubing used in Fig. 1 and is taken on the section line 3—3.

Referring to Figs. 1 and 2 the numeral 10 indicates the cylinder in which the piston 50 reciprocates. A piston rod 66 can pass either way from the hub 52 of the piston 50 through the heads 11 and 12 which close the ends of the cylinder 10. The piston 50 is provided with rings 20 and an opening or hollow portion 51 through which the circulating agent passes.

Hollow rods or tubing 57 and 59 project from the piston 50 through the heads 11, through a packing gland 64, on through the distribution chambers 54 and 62 and on out through the packing glands 64 at the far end so a constant volume is maintained in the circulating system for all positions of the piston 50.

The circulating agent enters the distribution chamber 54 through the inlet 55 and surrounds the rod 57 in the space 53. One or more inlets 56, holes in the side of the rod or tubing 57, allow the fluid to enter the inside of the rod or tube 57 where it is conducted through an opening or openings to the hollow portion 51 of the piston 50. After passing through suitably arranged passageways or opening in the piston 50 it then leaves from another part of the piston 50 through the rod or tube 59 and out the opening or openings 60 in the side of the tube 59, into the distribution chamber 62 where it surrounds the rod or tube 59 in the space 61. From the space 61 it then passes out through the discharge opening 63 in the distribution chamber 62. Partitions or plugs 65, conveniently located in the tubes or rods 57 and 59, prevent the circulating agent from running out the open ends of the tubes or rods 57 and 59.

In Fig. 1 the piston rod 66 passes through the head 11, on through a packing gland 67 and is connected to the usual engine driving mechanism indicated by numerals 68 and 69. This arrangement greatly reduces the over-all length of the engine because the distribution chambers 54 and 62 are mounted along side the driving mechanism 68 and 69. While the inner ends of the distribution chambers 54 and 62 are securely mounted and aligned with the tubes 57 and 59 at the cylinder head 11 the outer ends can be free to move slightly to adjust to the true running positions of the tubes 57 and 59 and the same is true for Fig. 2 also.

Where there is plenty of room or other reasons deem it necessary the piston rod 66 of Fig. 1 can pass out through the cylinder head 12 as shown in Fig. 2. In this case the rest of the usual driving mechanism 68 and 69 including the packing gland 67, which is not shown, is to the right of the cylinder head 12. While a very simple type of piston is shown in Figs. 1 and 2 having a large hollow portion 51, it will be understood the rods or tubes 57 and 59 can be mounted in any type of piston provided with a passage way connecting the two rods. The heads 11 and 12 may be provided with a jacketing system 27 as shown. The cylinder 10 can be jacketed also if necessary to prevent overheating.

The rods or tubes 57 and 59 of Fig. 2 have only a single passageway but special types of thin wall light weight tubing having a reinforcing portion 58 through its opening may be used to an advantage in some types of engines. A tubing 57 and 59 is shown in Figs. 1 and 3 having this construction. The Fig. 3 is a cross-section of Fig. 1 on the section line 3—3. Where a tubing having a plurality of openings is used the circulating agent flows in the same direction through all the passage ways.

The Fig. 1 discloses a simple type of open piston 50 with rings 20 on both sides of the annular opening at 51. The circulating agent comes into direct contact with the cylinder barrel 29 of the cylinder 10. When an open type of piston is used the circulating agent should be more than a cooling agent; it should seal and lubricate the piston 50 and rings 20 as well. The open type of piston is well suited to condensing steam engines using water and graphite lubricated piston rings. Oil contaminates the exhaust steam, rendering it unfit for other uses and oil quickly fouls condensers.

In internal combustion engines and high temperature steam or hot gas engines exhausting to the atmosphere the closed type of piston 50 of Fig. 2 can be used and oil lubricated.

From the description of the means for circulating a cooling agent, or cooling, sealing and lubricating agent through engine pistons shown herein, it will be noted the mechanism is free of flexible connections. The hollow rods or tubes 57 and 59 reciprocate with the pistons to which they are connected and travel back and forth completely through the distribution chambers 54 and 62 and are positively sealed against leakage by the packing glands 64.

In the appended claims, the expression "circulating agent" will be employed to designate a cooling medium or a cooling, sealing and lubricating agent, whichever may be employed. Oil, water, wet steam, wet air and other liquids or wet vapors can be used.

I find three items of construction are very important;

(1) A mechanism be used that gives a constant volume in the circulating system for all positions of the reciprocating piston.

(2) An effective and positive seal be used surrounding the tubes or hollow rods to prevent leakage along the rods.

(3) The circulating agent must be sent through the system under sufficient pressure to prevent the reciprocating motion of the piston from throwing it out through the conducting tubes used.

Changes may be made in the details of construction

I claim:

1. In a reciprocating piston engine, a cylinder with a piston reciprocating therein, said piston having a hollow portion or passage way for holding or conducting a circulating agent, a hollow rod or tube, having a passage way or passage ways, securely mounted in said piston for admitting a circulating agent into said hollow portion or passage way and at a point part way around said piston another hollow rod or tube, with a passage way or passage ways, securely mounted in said piston and through which said circulating agent can leave said hollow portion or passage way in said piston, said hollow rods or tubes extending from said piston through a cylinder head and parallel to a center line extending longitudinally through said cylinder, said hollow rods or tubes extending on through packing glands or other means for securing a positive seal against leakage at said cylinder head, on through individual distribution chambers longer than the stroke or travel of said piston and on through the far end of said distribution chambers so a constant volume can be maintained in the circulating system for all positions of said piston, the far ends of said distribution chambers provided with packing glands or other means for securing a positive seal against leakage along said hollow rods or tubes, said distribution chambers having a space surrounding said hollow rods or tubes longer than the stroke or travel of said piston and in constant communication with the inside of said hollow rods or tubes through holes or passage ways in the side of said hollow rods or tubes and an outlet or an inlet in the side of said distribution chambers through which said circulating agent can enter or leave, depending upon which way said circulating agent is traveling through said circulating system.

2. In a reciprocating piston engine, a cylinder with a piston reciprocating therein, said piston having a hollow portion or passage way for holding or conducting a circulating agent, a hollow rod or tube, having a passage way or passage ways, securely mounted in said piston for admitting a circulating agent into said hollow portion or passage way and at a point part way around said piston another hollow rod or tube, with a passage way or passage ways, securely mounted in said piston and through which said circulating agent can leave said hollow portion or passage way in said piston, said hollow rods or tubes extending on through packing glands or other means for securing a positive seal against leakage at the cylinder head, on through individual distribution chambers longer than the stroke or travel of said piston and on through the far end of said distribution chambers so a constant volume can be maintained in the circulating system for all positions of said piston, the far ends of said distribution chambers provided with packing glands or other means for securing a positive seal against leakage along said hollow rods or tubes, said distribution chambers having a space surrounding said hollow rods or tubes longer than the stroke or travel of said piston and in constant communication with the inside of said hollow rods or tubes through holes or passage ways in the side of said hollow rods or tubes and an inlet or outlet in the side of said distribution chambers, depending upon which way said circulating agent is traveling through said circulating system, said hollow rods or tubes having plugs or partitions conveniently located to prevent said circulating agent from leaving the open ends of said hollow rods or tubes.

3. In a reciprocating piston engine, a cylinder with a piston reciprocating therein, said piston having a hollow portion or passage way for conducting or holding a circulating agent, a hollow rod or tube, having a passage way or passage ways, securely mounted in said piston for admitting a circulating agent into said hollow portion or passage way and at a point part way around said piston another hollow rod or tube, with a passage way or passage ways, securely mounted in said piston through which said circulating agent can leave said hollow portion or passage way in said piston, said hollow rods or tubes extending from said piston through a cylinder head and parallel to a center line extending longitudinally through said cylinder, said hollow rods or tubes extending on through packing glands or other means for securing a positive seal against leakage at said cylinder head, on through individual distribution chambers longer than the stroke or travel of said piston and said hollow rods or tubes, or a suitable extension added thereto, extend on through the far end of said distribution chambers so a constant volume can be maintained in the circulating system for all positions of said piston, the far ends of said distribution chambers provided with packing glands or other means for securing a positive seal against leakage along said hollow rods or tubes, or suitable extension thereof, said distribution chambers having a space surrounding said hollow rods or tubes longer than the stroke or travel of said piston and in constant communication with the inside of said hollow rods or tubes through holes or passage ways in the side of said hollow rods or tubes and an inlet or outlet in the side of said distribution chambers through which said circulating agent can enter or leave, depending upon which way said circulating agent is traveling through said circulating system.

References Cited in the file of this patent

UNITED STATES PATENTS

| | | |
|---|---|---|
| 1,051,008 | Reuter | Jan. 21, 1913 |
| 1,742,028 | Elliott | Dec. 31, 1929 |

FOREIGN PATENTS

| | | |
|---|---|---|
| 131,682 | Great Britain | Sept. 4, 1919 |
| 1,157,671 | France | Dec. 30, 1957 |